United States Patent
Schaller

(10) Patent No.: US 10,619,277 B2
(45) Date of Patent: Apr. 14, 2020

(54) FIXING AID FOR SIMPLE FIXING OF SEWN COVERINGS ON SUPPORT PARTS

(71) Applicant: Leather Components Vertriebs-UG (haftungsbeschraenkt), Rosengarten (DE)

(72) Inventor: Wolfgang Schaller, Schwaebisch Hall (DE)

(73) Assignee: Leather Components Vertriebs-UG (haftungsbeschraenkt), Rosengarten (DE)

( * ) Notice: Subject to any disclaimer, the term of this patent is extended or adjusted under 35 U.S.C. 154(b) by 269 days.

(21) Appl. No.: 15/559,548

(22) PCT Filed: Mar. 1, 2016

(86) PCT No.: PCT/DE2016/000090
§ 371 (c)(1),
(2) Date: Sep. 19, 2017

(87) PCT Pub. No.: WO2016/162000
PCT Pub. Date: Oct. 13, 2016

(65) Prior Publication Data
US 2018/0044832 A1 Feb. 15, 2018

(30) Foreign Application Priority Data

Apr. 8, 2015 (DE) .................. 20 2015 002 525 U
Sep. 21, 2015 (DE) .................. 20 2015 006 497 U

(51) Int. Cl.
*D05B 93/02* (2006.01)
*B60R 13/02* (2006.01)
*B60N 2/58* (2006.01)

(52) U.S. Cl.
CPC .......... *D05B 93/02* (2013.01); *B60N 2/5883* (2013.01); *B60R 13/02* (2013.01); *B60R 2013/0293* (2013.01)

(58) Field of Classification Search
CPC . D05B 93/02; D05B 1/18; D05B 1/20; D05B 3/22; D05B 15/00; D05B 15/005;
(Continued)

(56) References Cited

U.S. PATENT DOCUMENTS 1,999,424 A * 4/1935 Seitz .................. A45C 3/00
    190/119
5,231,745 A * 8/1993 Phelan .................. A47C 7/18
    264/45.1
(Continued)

FOREIGN PATENT DOCUMENTS

DE         203 07 988 U1   9/2004
DE   10 2004 053 133 A1   5/2006
(Continued)

OTHER PUBLICATIONS

International Search Report of PCT/DE2016/000090, dated May 27, 2016.
(Continued)

*Primary Examiner* — Ismael Izaguirre
(74) *Attorney, Agent, or Firm* — Collard & Roe, P.C.

(57) ABSTRACT

A sewn covering for covering support parts includes at least one first and at least one second trim cover element which are connected to one another via a functional seam. A soft insert runs along at least some sections of the functional seam. The seam stump formed by the functional seam can be surrounded by a seam band which can be fixed by the functional seam. To produce such a sewn covering, a band can be used which has an at least partially elastic seam band that is perforated in the longitudinal direction. At least one
(Continued)

soft insert is provided in the longitudinal direction of the partially elastic seam band, which insert is fixed to the seam band.

21 Claims, 6 Drawing Sheets

(58) Field of Classification Search
CPC .............. B60R 13/02; B60R 13/0206; B60R 2013/0293; B60N 2/58; B60N 2/5816; B60N 2/5883
See application file for complete search history.

(56) References Cited

U.S. PATENT DOCUMENTS

| | | | |
|---|---|---|---|
| 5,236,243 A | 8/1993 | Reyes | |
| 5,669,129 A * | 9/1997 | Smith | B29C 63/02 29/418 |
| 7,445,828 B2 | 11/2008 | Sieber et al. | |
| 7,752,985 B2 * | 7/2010 | Morita | B60N 2/78 112/475.04 |
| 8,293,055 B2 * | 10/2012 | Aoyama | B29C 65/5042 156/245 |
| 2011/0305864 A1 * | 12/2011 | Masuda | B60N 2/5833 428/86 |
| 2012/0306256 A1 * | 12/2012 | Okuyama | B60N 2/5825 297/452.6 |
| 2014/0283343 A1 | 9/2014 | Okawa et al. | |

FOREIGN PATENT DOCUMENTS

| | | |
|---|---|---|
| DE | 10 2010 034598 A1 | 2/2012 |
| DE | 10 2012 100 891 A1 | 8/2013 |
| DE | 10 2013 014 687 A1 | 3/2015 |
| EP | 1 508 436 A1 | 2/2005 |
| JP | 2001197970 A | 7/2001 |
| KR | 20140045108 A | 4/2014 |
| KR | 101410211 B1 | 6/2014 |
| LU | 91866 A1 | 3/2013 |
| WO | WO 0137710 A1 * | 5/2001 |
| WO | 03/080312 A1 | 10/2003 |

OTHER PUBLICATIONS

German Search Report in DE 20 2015 002 525.0, dated Sep. 9, 2015, with English translation of relevant parts.
English translation of the Written Opinion of the International Searching Authority in PCT/DE2016/000090, dated May 27, 2016.
Expanded European Search Report in EP Application No. 19154010.3-1132 dated Feb. 28, 2019 with English translation of relevant parts.
European Office Action in EP Application No. 16711962.7-1132 dated Feb. 27, 2019 with English translation of relevant parts.
Expanded European Search Report in EP Application No. 19154027.7-1132 dated Feb. 28, 2019 with English translation of relevant parts.
Office Action from Chinese Application No. 201680019224.4 dated Aug. 29, 2019.

* cited by examiner

FIXING AID FOR SIMPLE FIXING OF SEWN COVERINGS ON SUPPORT PARTS

CROSS REFERENCE TO RELATED APPLICATIONS

This application is the National Stage of PCT/DE2016/000090 filed on Mar. 1, 2016, which claims priority under 35 U.S.C. § 119 of German Application Nos. 20 2015 002 525.0 filed on Apr. 8, 2015, and 20 2015 006 497.3 filed on Sep. 21, 2015, the disclosures of which are incorporated by reference. The international application under PCT article 21(2) was not published in English.

TECHNICAL FIELD

The invention relates to a sewn covering for laminating support parts (molded parts). Laminating is understood as connecting a plurality of tiers of identical or dissimilar materials by suitable laminating means, in particular by an adhesive. A material can be protected or decorated by laminating. Components are increasingly being laminated across ever larger areas in particular for interiors in the automotive industry, so as to decorate said components in particular with leather or imitation leather or else with synthetic materials and to impart to these components a high-quality visual appeal. This can relate to the dashboard, the center consoles, the doors, or the parcel shelves, for example. However, applications are also conceivable in the aerospace industry or the furniture industry, for example. Overall, molded cushions from foam or elastomers, or else hard molded components, can be laminated.

PRIOR ART

In order for support parts to be laminated, a sewn covering is typically produced first in that two or a plurality of sewn goods (cover elements) are interconnected by way of a functional seam. A seam stump is formed by the functional seams on the lower side of the sewn covering. These seam stumps can be placed into a groove of the support part that is constructed to this end and is also referred to as the seam trench. The sewn covering must be precisely aligned on the support part. This is performed by placing the sewn covering on the support part, by subsequently aligning the functional seams of the sewn covering, and by fixing the aligned functional seam by means of seam pins. The sewn covering in the region of the functional seams must subsequently be adhesively bonded to the support part in that the thermally activatable adhesive that is present on the lower side of the sewn covering by means of a hot-air gun is manually activated in the vicinity of the functional seams. The functional seam can no longer shift following this step. The remaining sewn covering is also fixed to the support part in a preliminary manner by means of a hot-air gun and by activating the thermally activatable adhesive. The remaining sewn covering can be subsequently laminated to the support part in a manner that is reliable in terms of the process, this being typically performed by non-contacting or membrane lamination by means of a thermal input. On account of the required manual preliminary fixation of the sewn covering on the support part, the lamination of molded parts by means of seam pins is time intensive and cost intensive. The manual preliminary fixation requires extensive practice on the part of the operator such that long training periods are required.

A seam band which can be used for reinforcing decorative seams is known from DE 10 2012 100 891 A1. This seam band in the longitudinal direction thereof has a rib or an elevation. Once the seam band has been fastened to the lower side of the sewn covering, the exposed rib or elevation can engage in a seam trench of the support part and thus likewise serve for the preliminary fixation of the sewn covering on the support part. This can take place only in regions which are overstitched with a decorative seam.

A method for producing a sewn covering for laminating support parts is known from DE 10 2013 014 687 A1, in which the seam stump after sewing of the functional seam is enveloped by a seam band in order for the functional seam to be retroactively stabilized. The seam band can be fastened to the seam stump by means of an adhesive layer; in addition thereto, the seam band by way of the decorative seams that are located beside the functional seam can be sewn to the sewn covering.

A sewn covering for laminating support parts, in which sewn covering a positioning element is attached to the lower side of the sewn covering in the region of the functional seam, is known from DE 10 2004 053 133 A1. The positioning element is sewn from below to the upwardly bent seam stump of the functional seam, wherein the seams required therefore are also visible on the front side, i.e. the visible side of the sewn covering. On account thereof, the seam stump has to be configured so as to be comparatively long, this resulting in an increased requirement of material. The positioning elements are thus not held by the functional seams but rather have been sewn to the sewn covering by way of the decorative seams.

DESCRIPTION OF THE INVENTION

Proceeding from this known state of the art, the invention is based on the object of specifying an improved sewn covering for laminating support parts, said improved sewn covering being able to be economically produced and fixed in a preliminary manner to the support part in as simple and rapid a manner as possible.

The sewn covering according to the invention for laminating support parts is achieved by the features described herein. A respective tape for producing such a sewn covering is achieved by the alternative features described herein. Expedient refinements of the invention are also described herein.

The sewn covering according to the invention for laminating support parts has at least one first and at least one second cover element which are interconnected by way of a functional seam, in particular a lockstitch seam. The functional seam is present on the lower side of the sewn covering that is to be placed on the support part, said functional seam from the peripheral regions of the two cover elements forming a seam stump. This seam stump at least in portions is enveloped by a soft insert. Fixing of the soft insert can be performed in particular in that said soft insert is sewn into the functional seam.

In the case of new support parts, the seam trench during the development phase is typically adapted to the seam stump. The soft insert ensures that the seam stumps in the cross section are widened such that the seam stumps can be fixed in the seam trenches that are available and can be squeezed thereinto such that fixing is possible along all functional seams. The seam stumps are thus securely fixed in a terminal position and are connected to the support part in a sufficiently strong manner such that said seam stumps can rarely shift out of the seam trenches. Placing the seam stumps into the seam trenches of the support parts herein can continue to be performed manually, wherein squeezing the soft insert into the seam trenches requires only light manual pressure. On account thereof, the sewn covering can be pre-positioned on the support part without further tools such as seam pins, for example, thus simplifying and accelerating the placing of the sewn coverings on the support parts. Moreover, the risk in terms of the process is minimized since any subsequent shifting of the seams from the seam trenches in downstream method steps is prevented. Any fixation of the areas directly beside the functional seam can thus be dispensed with. The pre-positioning of the sewn coverings is thus reliable and reproducible, reducing material waste and enhancing the overall visual appeal of the laminated support parts. Also, it is no longer necessary for the seam stumps by means of a hot-air gun to first be fixed in a preliminary manner in the seam trenches of the molded part.

The soft insert can be in particular felt, leather, plastic, silicone, cardboard, paperboard, paper, rubber, granules, foam rubber, non-woven material, wood, or foam. The soft insert can be configured as a textile insert made from synthetic or natural materials, for example. The hardness and the thickness and the strength of the soft insert can differ according to the application case. The soft insert can be configured, as foam, as non-woven material, as a compressed fibrous material, as a warp/weft knitted fabric, as a woven fabric, or else as a film/foil. It would also be possible for an electrically conductive material to be used as the soft insert. On account thereof, the soft insert after fixation could for example be expanded by applying a voltage such that any shifting of the sewn covering from the support part can be reliably prevented.

In one particularly preferred embodiment, the soft insert can at least in portions be provided with a reinforcement material in order for the processing of the soft insert by machine, in particular by means of a sewing machine, to be facilitated. The reinforcement material herein has the task of influencing the elongation behavior of the soft insert such that the soft insert can no longer be elongated or compressed in an arbitrary manner, which would lead to an untidy sewing result. The reinforcement material can be present on both sides of the soft insert or else only on the upper or the lower side of the soft insert. Said reinforcement material can be present across the entire area or else only in that peripheral region of the soft insert in which the acquisition of the soft insert is performed in particular by the sewing machine. It would also be possible for such a reinforcement material to be provided only so as to be centric in the soft insert.

The reinforcement material can be in particular a non-woven material, a warp/weft knitted fabric, a foam, a flocked material, or a film/foil. It would also be possible for a liquid reinforcement material which solidifies upon application to the soft insert to be used. The reinforcement material should preferably be configured so as have a sufficient gliding ability in order to enable an unproblematic and as far as possible a friction-free transportation in the sewing machine.

In one particularly advantageous embodiment, the seam stump can be enveloped by a seam band which is fixed by the functional seam. In principle, the soft insert that is present at least in portions can be present between the seam band and the seam stump, or else on the external side of the seam band. A particularly positive contact with the groove of the molded part can be established if the soft insert is disposed on the external side of the seam band. The use of a seam band without a soft insert can also provide significant advantages if the seam band is sewn in conjointly with the functional seam and is thus fixed by way of the functional seam. The embodiment of a sewn covering having a seam stump which is enveloped only by a seam band which is fixed by way of the functional seam is thus of independent inventive significance. In this way, a seam band can thus be used for the first time also in the case of such sewn coverings in which no decorative seam is to be present. Until now, a fastening of the seam band by way of only an adhesive layer has not been considered adequate in order for a reproducible and reliable fastening of the seam band to be achieved on the sewn covering. The seam band thus had to be inevitably sewn by way of the decorative seams such that a seam band was feasible only in the case of such sewn coverings in which a decorative seam was also applied. However, this is the case only in a comparatively small proportion of all sewn coverings for lamination. Henceforth, all sewn coverings which are to be used for laminating support parts can be provided with a seam band such that stabilizing and fixing of all functional seams of a sewn covering becomes possible.

The seam band can be composed of natural material or of a synthetic material, or at least comprise such material. A combination of natural and synthetic material would also be conceivable. The seam band can be a film/foil, a non-woven material, a warp/weft knitted fabric, or a woven fabric. Coating of the seam band would optionally also be possible. It would also be possible for an electrically conductive material to be used as the seam band. The thickness of the seam band can be in particular between 0.1 millimeters and 3 millimeters. It would also be possible for the seam band to be configured in a correspondingly thicker manner.

In one advantageous embodiment, the at least one soft insert can be present between the seam stump and the seam band. The comparatively delicate soft insert is thus protected by the seam band and cannot be damaged during the processing steps for producing the sewn covering, which would impede the later functioning of the soft insert. It can also be achieved by this arrangement that the seam stump slides particularly easily into the seam trench. A further advantage is that the seam stump that is enveloped by the soft insert is indeed somewhat squeezed but that the seam band lying outside continues to allow for repositioning in the longitudinal direction of the seam trench, in order for a precise alignment to be enabled.

The soft insert can preferably be disposed only in the region of the seam stump but not in the region of the functional seam. The visual seam image of the functional seam thus remains inconspicuous to a desired maximum extent, and no soft insert can inadvertently be visible in the region of the functional seam. Moreover, the functional seam on account of the sewn-in seam band is imparted more stability and on account thereof runs in a visually more compact, more rectilinear, and smoother manner such that a compact seam image is achieved.

On account thereof, the seam stump that is enveloped by the soft insert and optionally also by the seam band can have an approximately teardrop-shaped cross section in which the functional seam forms a tapering. Such a cross section can also be held so as to be particularly well pressed into seam trenches. The seam trenches could also have a corresponding tapering which would additionally improve the retention of the seam stumps in the seam trenches.

In one further advantageous embodiment, the seam band in the longitudinal direction can be configured so as to be perforated at least in portions. A perforation that is disposed so as to be centric can facilitate the bending of the seam band when being sewn into the functional seam, since the seam band can be more easily folded in a centric manner. On account thereof, the seam band lies in a uniform manner on both seam vanes, this leading to the seam band on both sides being able to be acquired equally well by the functional seam. On account of the perforation the sewn covering upon completion of the functional seam can also be more easily placed in curves.

On account of the perforation the soft insert lying on the inside can optionally also obtain contact with the seam trench of the support part. This leads to an additional anti-slippage effect which further impedes the shifting of the seam stump from the seam trench and thus the shifting of the sewn covering on the support part. This can be the case in particular when the perforation of the seam band is non-centric.

Additionally thereto, the soft insert can also be configured so as to be perforated at least in portions, in order for bending to be further facilitated when said soft insert is being sewn into the functional seam, in particular in the region of rounded features.

The perforation of the seam band and/or soft insert can be implemented by angular incisions or perforated holes, for example. Such a perforation would also result from a configuration of the seam band and/or of the soft insert having cut-outs of various shapes and/or sizes, or having slots.

The seam band can be sewn to the peripheral regions of the individual cover elements, in order for more rapid fixing of the sewn coverings to be initiated in the peripheral regions (folded regions).

The measures described above permit a reduction in the process times in the preliminary fixing of the sewn coverings of up to a total of 60 percent in mass production. The expensive preliminary fixing installations having seam pins can also be dispensed with, on account of which the installation costs of the preliminary fixing installations can be reduced by up to 80 percent. Instead of the preliminary fixing installations, only a simple component receptacle onto which the support part to be laminated is mounted is required. Personnel and time costs for the preliminary fixing can also be reduced by up to 80 percent, since the preliminary fixing of the sewn coverings on the support parts by means of seam pins and the activation of the adhesive layers of the functional seams can be dispensed with, the process thus requiring less training time.

At least one decorative seam which is disposed at certain spacing from the functional seam and runs parallel with the functional seam can preferably be present in the sewn covering. In particular, two decorative seams which are disposed on either side of the functional seam can be present. The decorative seams herein serve in visually enhancing the area of the sewn covering, since the former set highlights and amplify contours. Decorative seams are increasingly seen as signs of a special product quality and in particular in the interior region of automobiles represent a decorative element of the support parts that are typically laminated with leather or artificial leather.

In one particularly preferred embodiment, the seam band on that external side thereof that is opposite the seam stump can be provided with an adhesive means. This adhesive means can in particular be thermally activatable and preferably have a low melting point so that an activation of the adhesive means can be performed already at comparatively low temperatures. On account thereof, additional adhesive bonding of the seam stump in the seam trench can be performed in the actual lamination procedure, on account of which any subsequent shifting of the sewn covering on the support part is further impeded. The adhesive means can be a PU film (polyurethane film) or a hot-melt film, for example. Additionally or alternatively thereto, the seam trench could also be provided with an adhesive means, for example also with a double-sided adhesive tape, in order for the functional seam to be additionally fixed in the seam trench.

The production of such a sewn covering can be performed, for example, in that the functional seam is first implemented, the soft insert in a separate operational step is then fastened to the seam stump of the functional seam, and the seam band is sewn on in a last step. However, the soft insert and the seam band can preferably be fastened to one another already at an earlier stage such that the fastening of the seam band to the soft insert can be performed in one single method step. The seam band having the soft insert herein can already be sewn into the functional seam when the functional seam is being stitched. This ensures a smoother and more harmonic visual appeal of the functional seam, since the seam band additionally strengthens the functional seam. The functional seam is also imparted more stability and is more resistant to rupturing. Moreover, in this way, no additional production steps are required for producing the functional seam.

In order for a sewn covering as described above to be produced, a tape such as is described in DE 10 2012 100 891 A1 can be used, for example. The soft insert herein can be disposed so as to be centric or eccentric in relation to the seam band. However, as opposed to the tape described therein, it has proven advantageous for the seam band in the longitudinal direction to be configured so as to be perforated.

In principle, the soft insert can already be present in a prefabricated manner on the seam band. However, it would also be possible for the soft insert to be applied to the seam band only during the sewing process of the functional seam.

Moreover, two soft inserts which are disposed so as to be mutually parallel and at a certain mutual spacing can preferably be present on the seam band. The perforation of the seam band in this case can preferably be configured in the region between the two soft inserts. Such an embodiment having two spaced apart soft inserts has the advantage that the teardrop-shaped cross section of the functional seam of the sewn covering is configured in a particularly simple and prominent manner, since the seam stump on both sides is widened by the soft insert. Moreover, the seam trench of the support part does not have to be configured that deep, since the soft insert does not completely envelop the seam stump but is present only on the sides of the seam stump. On account thereof, the seam stumps can be fixed in the seam trench of the support part in a particularly simple and secure manner. Such lateral squeezing of the seam stump would thus be sufficient for fastening.

The two soft inserts can typically be present on the same side of the seam band. However, it would also be possible for two or a plurality of soft inserts to be provided on different sides of the seam band. Upon being sewn in, one part of the soft inserts could in this case be present between the seam band and the seam stump of the sewn covering, while another part of the soft inserts would be disposed on the external side of the seam band. On account thereof, it would also be possible for the individual soft inserts to be provided with dissimilar surfaces such that a readily slipping soft insert or a soft insert having an anti-slippage effect could be used in a targeted manner.

Further advantages and features of the invention can be derived from the further features stated in the claims and from the exemplary embodiments hereunder.

BRIEF DESCRIPTION OF THE DRAWING

The invention will be described and explained in more detail hereunder by means of the exemplary embodiments illustrated in the drawing in which.

MEANS OF IMPLEMENTING THE INVENTION

Figure 1:
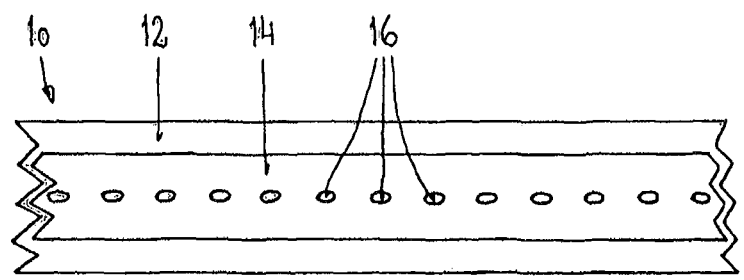
FIG. 1 shows a plan view of a first embodiment of the tape according to the invention.
Figure 2:
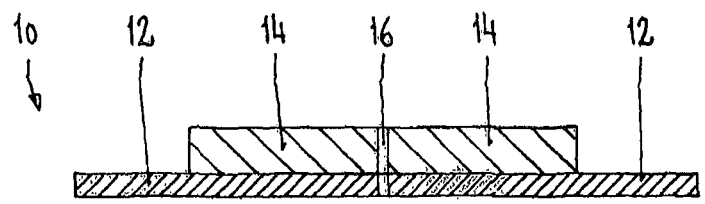
FIG. 2 shows a cross section through the tape according to FIG. 1.

A first embodiment of the tape 10 according to the invention is illustrated in FIGS. 1 and 2. The tape 10 has a seam band 12 which is between 0.1 to 10.0 millimeters in thickness. The seam band 12 is preferably between 0.2 and 0.5 millimeters in thickness, such that the seam band 12 in the finished sewn covering does not show up in the region that adjoins the functional seam. A soft insert 14 is disposed so as to be centric to the longitudinal axis of the seam band 12. The soft insert 14 can be between 0.3 and 10.0 millimeters in thickness. The soft insert in the present exemplary case is 1.0 millimeter in thickness.

The soft insert 14 in the present exemplary case is present as having been adhesively bonded to the seam band 12. Alternatively thereto, the soft insert 14 could also be sewn onto the seam band 12. In principle, other possibilities of fastening the soft insert 14 to the seam band 12 would also be feasible.

A perforation in the form of a plurality of cut-outs 16 which are present at a spacing of approximately 4.5 millimeters are present in the present exemplary embodiment, both in the seam band 12 as well as in the soft insert 14, so as to be centric along the longitudinal axis of the seam band 12. The cut-outs 16 form a perforation such that the tape 10 can be kinked along the longitudinal axis thereof in a particularly simple manner. This facilitates the sewing of the tape 10 into a functional seam, since the seam band 12 more readily folds into the framing aid of the sewing machine that is provided therefore. In the case of the tape 10.3 according to FIG. 3, the perforation in the soft insert 14.3 and in the seam band 12.3 is configured in the form of a plurality of slots 18. The spacing and the size of the slots 18 and of the cut-outs 16 can be adapted to the respective conditions, for example to the material of the sewn covering to be sewn, or to the width or the material of the soft insert and of the seam band, respectively. The shape of the cut-outs 16 can be individually chosen.

As opposed to these exemplary embodiments illustrated here, also only the seam band 12, 12.3, or only the soft insert 14, 14.3, could have a perforation in the form of cut-outs 16 or of slots 18.

In the case of the exemplary embodiments illustrated here, the soft insert 14, 14.3 does not extend up to the external periphery of the seam band 12, 12.3. On account thereof, the soft insert 14, 14.3 typically is not present in the region of the functional seam. By contrast thereto, the soft insert could also extend across the entire width of the seam band. In this case, the soft insert would also be present in the region of the functional seam.

Figure 3:
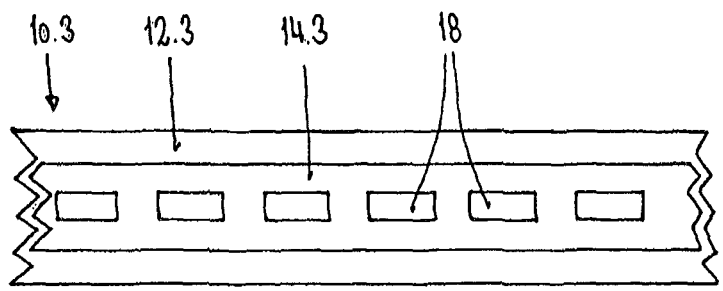
FIG. 3 shows a plan view of the second embodiment of the tape according to the invention.
Figure 4:
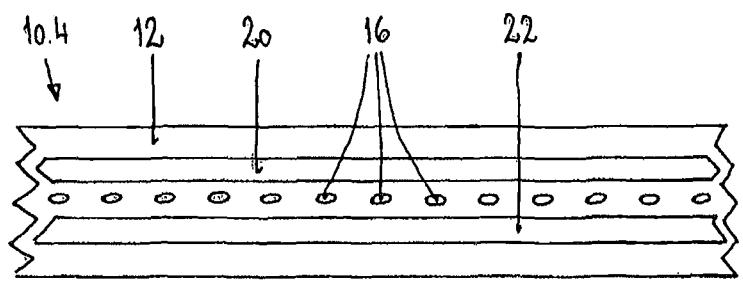
FIG. 4 shows a plan view of a third embodiment of the tape according to the invention.
Figure 5:
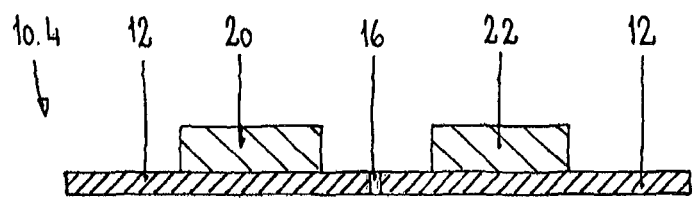
FIG. 5 shows a cross section through the tape according to FIG. 4.

An alternative embodiment of the tape 10.4 according to FIGS. 4 and 5 provides that a total of two soft inserts 20, 22 are fastened to the seam band 12. The two soft insert strips 20, 22 in this case run so as to be mutually parallel and at a certain mutual spacing. The perforation which is not obscured by the soft insert strips 20, 22 is present in the form of cut-outs 16 along the centerline of the seam band 12. In the case of the tape 10.6 according to FIG. 6, the perforation in the seam band 12.3 according to FIG. 3 is configured in the form of a plurality of slots 18.

As opposed to the exemplary embodiment illustrated here, the centric perforation in the form of cut-outs 16 and/or of slots 18 can also be dispensed with in the case of the tape 10.4, 10.6, since the seam band 12, 12.3 in this case on account of the absent soft insert in the central region can already be quite readily kinked in a centric manner.

Additionally or alternatively to the centric perforation, it would also be possible for the seam band 12, 12.3 to be provided with a lateral perforation which would be present in the region of the soft insert 14, 14.3, or 20, 22, respectively. Such a lateral perforation could by implemented by cut-outs, slots, or other incisions, for example. The soft insert 14, 14.3, 20, 22, on account of this lateral perforation, can come into direct contact with the seam trench of the support part, leading to an improved adhesion of the sewn covering to the seam trench wall, and further facilitating the preliminary fixing of the sewn covering on the support part.

Figure 6:
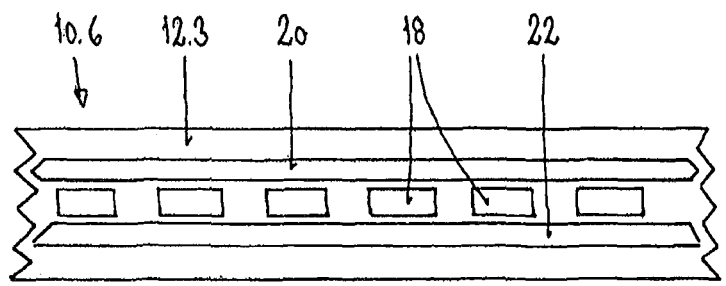
FIG. 6 shows a plan view of a fourth embodiment of the tape according to the invention.

By contrast to the embodiments shown in FIGS. 4 to 6, one of the two soft insert strips 20, 22 could also be dispensed with. In this case, the soft insert would no longer be present so as to be exactly centric to the seam band 12.

Figure 7:
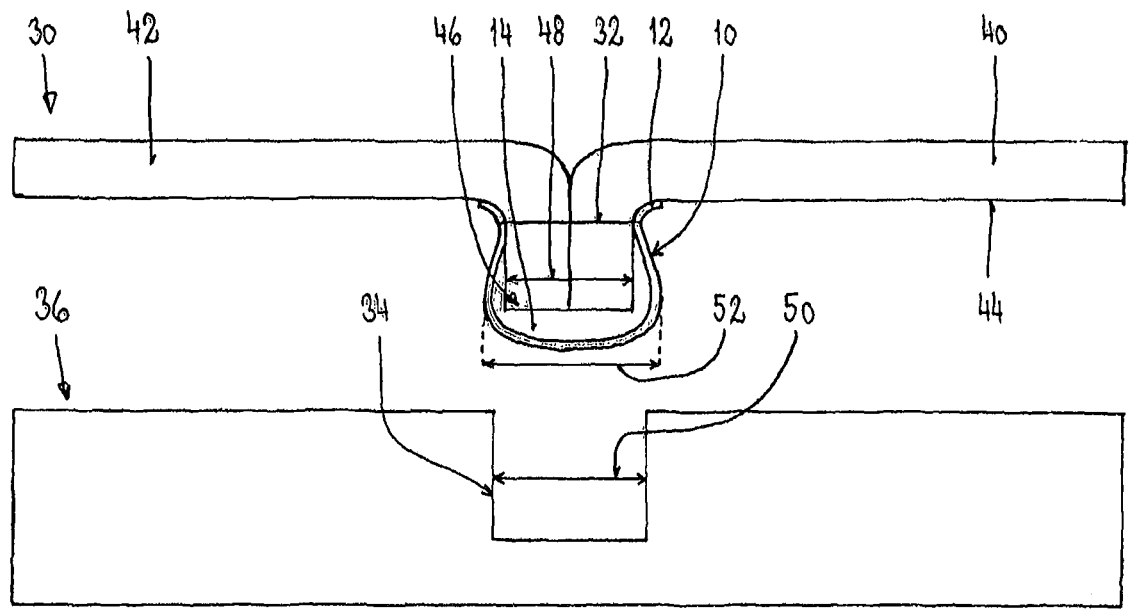
FIG. 7 shows a cross section through a first embodiment of the covering according to the invention, having a tape according to FIG. 1 or 3, prior to being placed into the groove of a molded part.
Figure 8:
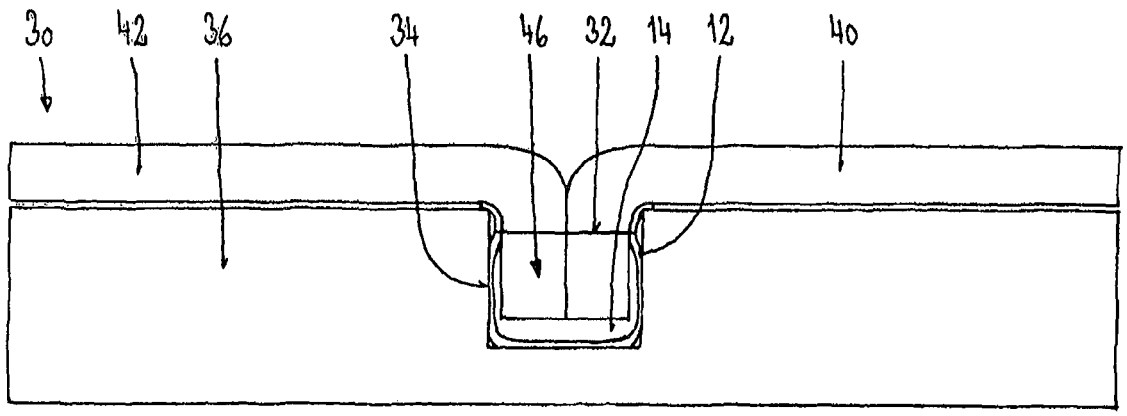
FIG. 8 shows a cross section through the covering according to FIG. 7 that is placed into the groove of a molded part.

FIGS. 7 and 8 show a first embodiment of the sewn covering 30 according to the invention, prior to and after the functional seam 32 has been placed into a seam trench 34 of a support part 36. The sewn covering 30 has two cover elements 40, 42 which are fastened to one another by means of a functional seam 32. The two cover elements 40, 42 in the present exemplary case are of leather or artificial leather; in principle, however, other materials of the cover elements 40, 42 are also conceivable. On account of the functional seam 32 a seam stump 46, also referred to as a seam vane, is formed on the lower side 44. The width 48 of the seam stump 46 is typically somewhat smaller than the width 50 of the seam trench 34 of the support part 36.

The seam stump 46 in the present exemplary case is enveloped by a tape 10 according to FIGS. 1 and 2. The seam band 12 herein is present as being sewn directly into the functional seam 32. The width of the soft insert 14 is chosen such that no soft insert 14 is present in the region of the functional seam 32. This ensures a harmonic and visually smooth functional seam. On account of the soft insert 14 that is present, an approximately teardrop-shaped cross section of the seam stump 46 that is enveloped by the soft insert 14 and by the seam band 12 is created, the maximum, width 52 of said seam stump 46 being somewhat larger than the width 50 of the groove 34 of the molded part 36.

The mounting of the sewn covering 10 in the seam trench 34 of the support part 36 (cf. FIG. 8) is performed by a displacement the soft insert 14 while the seam stump is pushed into the groove 34 that is provided therefore. On account thereof, the soft insert 14 is squeezed, and the seam stump 46 and thus also the covering 10 are thus locked into the seam trench 34 that is constructed to this end. The functional seams 32 are thus positioned, said functional seams 32 now being fixed in a preliminary manner such that the remaining sewn covering 10 can likewise be fixed in a preliminary manner.

By contrast to the exemplary embodiment illustrated here, the sewn covering 10 could also be produced by means of a conventional seam band and of a strip-shaped soft insert, without the seam band and the soft insert first having to be fastened to one another. The seam band and the soft insert could thus be interconnected only during the sewing process for producing the functional seam. In this case, a first band spool could keep a reserve of the seam band, and a second band spool could keep a reserve of the soft insert. Both band spools could be attached on top of one another, beside one another, behind one another, or else at different places of the sewing machine or of the working space, such that the seam band and the soft insert would run into the sewing machine in a mutually parallel manner and so as to be disposed directly on top of one another. The soft insert and the seam band can be guided in a controlled manner in the tool of the sewing machine, be placed around the peripheral region of the two cover elements, and be fastened to the sewn covering by way of the functional seam. It can be sufficient herein for the seam band to be fastened only by way of the functional seam, while the soft insert would come to lie quasi loosely between the seam stump and the seam band. However, since the seam band bears on the seam stump in a sufficiently taught manner, any shifting of the soft insert can be precluded.

Figure 9:
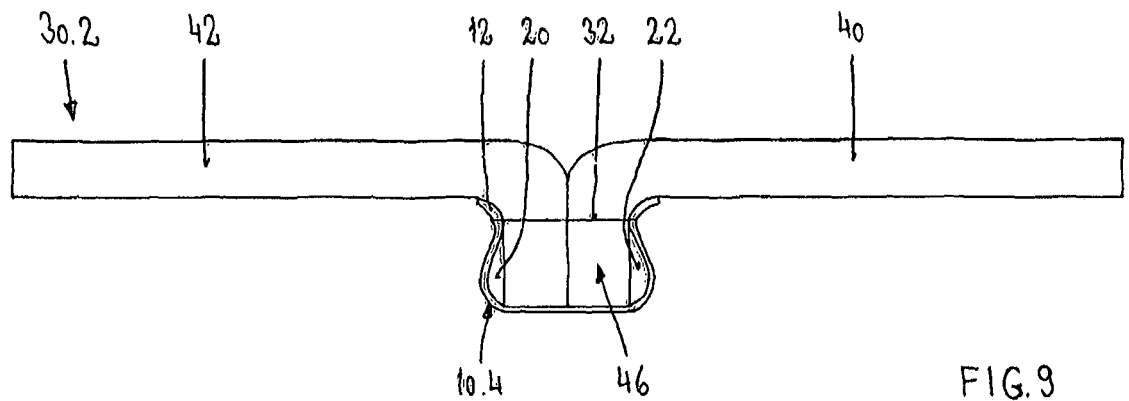
FIG. 9 shows a cross section through a second embodiment of the covering according to the invention, having a tape according to FIG. 4 or 6.

A second embodiment of the sewn covering 30.2 according to the invention is illustrated in FIG. 9. In the case of the sewn covering 30.2 the tape 10.4 according to FIG. 4 has been used instead of the tape 10 according to FIG. 1 for enveloping the seam stump 46. On account thereof, an approximately teardrop-shaped cross section of the seam stump 46 that is enveloped by the two soft insert strips 20, 22 and by the seam band 12 can also be achieved.

Figure 10:
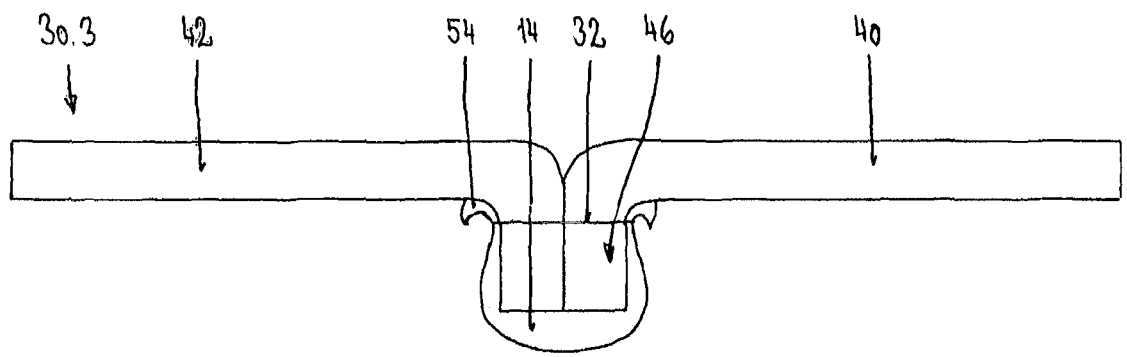
FIG. 10 shows a cross section through a third embodiment of the covering according to the invention.

According to FIG. 10, only one soft insert 14 can also be used in an alternative embodiment of the covering 30.3. In this case, the soft insert 14 is sewn to the seam stump 46 by means of the functional seam 32. The external side of the soft insert 14 can be provided with a sliding coating in order for the sewing of the soft insert 14 into the functional seam 32 to be facilitated. The soft insert in this case could also be implemented by a soft thick seam band having a thickness of approximately 0.3 to 5.0 millimeters.

Figure 11:
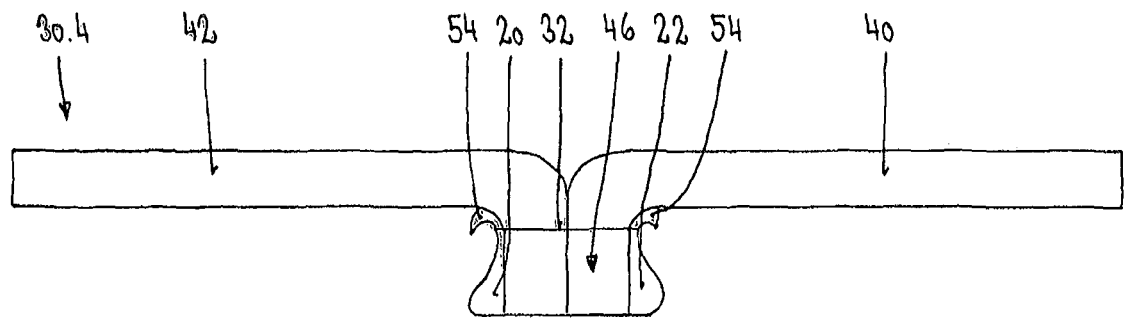
FIG. 11 shows a cross section through a fourth embodiment of the covering according to the invention.

It would also be possible for in each case one soft insert strip 20, 22 to be fastened to the two external sides of the seam stump 46. Such a sewn covering 10.4 is illustrated in FIG. 11. The two outwardly pointing sides of the soft insert strips 20, 22 can in each case be provided with a sliding coating also in this case. The two soft insert strips 20, 22 can be adhesively bonded to the lower side of the two cover elements 40, 42, for example, and be conjointly acquired by the functional seam 32 when the latter is being sewn. It would also be possible for the two soft insert strips 20, 22 not to be acquired by the functional seam 32; the soft insert strips 20, 22 in this instance would have to be fixed on the seam stump 46 in another suitable manner. This can be established by an adhesive procedure or by a tacking procedure, for example.

In as far as the soft insert strips 20, 22, or the soft insert 14, respectively, according to FIG. 10 are not acquired by the functional seam 32, no bulging 54 can form above the functional seam 32 which following the lamination of the sewn covering 30.3, 30.4 to the support part 36 could show up on the laminated visible surface of the latter.

Figure 12:
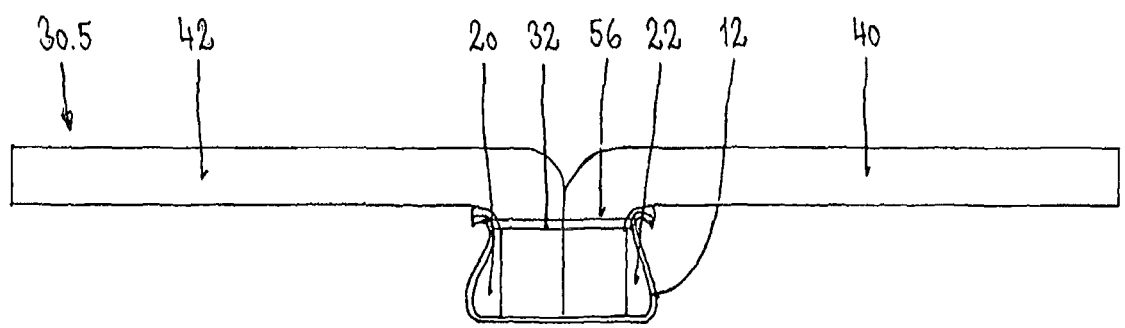
FIG. 12 shows a cross section through a fifth embodiment of the covering according to the invention.

In a second processing step, the sewn covering 30.4 according to FIG. 11 can be retrofitted with a seam band 12 such that the sewn covering 30.5 illustrated in FIG. 12 is created. To this end, the seam band 12 is retrofitted by sewing a further functional seam 56. The two functional seams 32, 56 can be disposed at approximately the same level such that a visually appealing image of the sewn covering 10.5 results when viewed from the front side.

The sewn covering 10.3 according to FIG. 10 could also be retrofitted with a seam band 12 in a comparable manner. In a modification of FIG. 11 it would also be possible for a soft insert strip 20 or 22 to be attached to only one side of the seam stump. It would also be possible in this case for the seam stump to be retroactively enveloped by a seam band in order for the unilateral soft insert strip to be fixed on the seam stump.

Alternatively, it would also be conceivable for the sewn seam stump to be guided through an immersion bath with silicone, an immersion bath with plastic, or an immersion bath with rubber, so as to achieve a suitable teardrop shape. It would also be possible for a plastic shrouding to be sprayed on.

Figure 13:
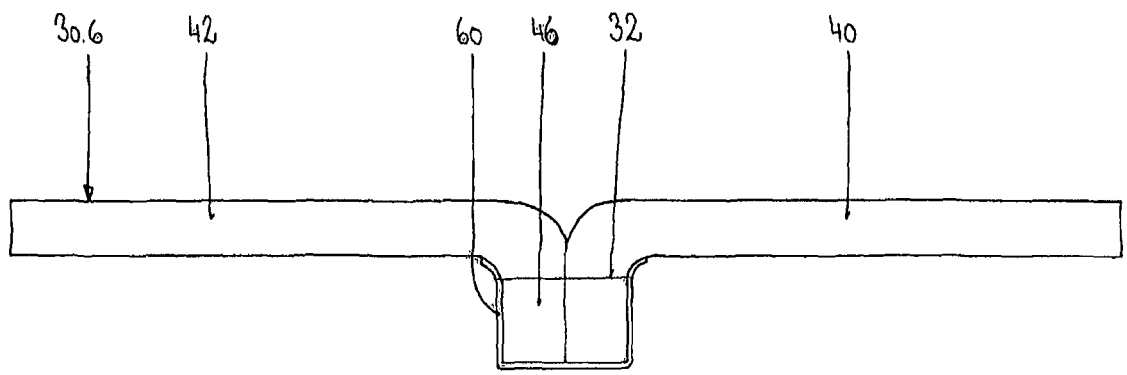
FIG. 13 shows a cross section through a sixth embodiment of the covering according to the invention.

A sixth embodiment of the sewn covering 30.6 according to the invention is illustrated in FIG. 13. In the case of the sewn covering 30.6 only a seam band 60 without an additional soft insert was used for enveloping the seam stump 46. The seam band 60 that is sewn into the functional seam 32 can fix and stabilize the functional seam 32, thus contributing toward a visually appealing image of the sewn covering 30.6.

Figure 14:
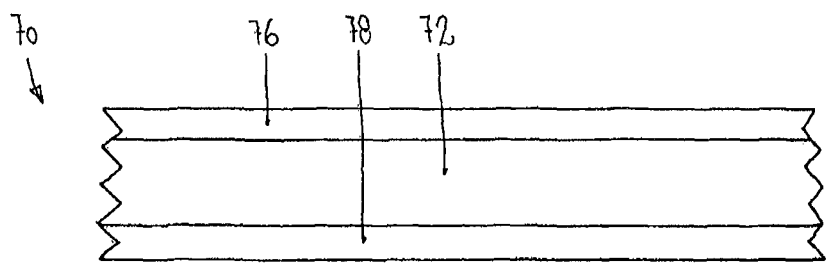
FIG. 14 shows a plan view of a soft insert that is coated with a reinforcement material.
Figure 15:
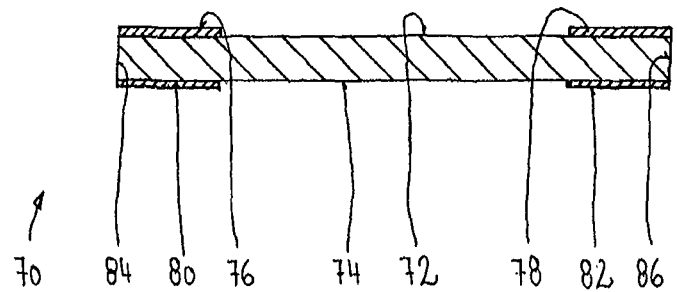
FIG. 15 shows a cross section through the soft insert according to FIG. 14.

A soft insert 70 in which the use of an additional seam band can be dispensed with is illustrated in FIGS. 14 and 15. The soft insert 70 in the present exemplary case is coated in each case with two reinforcement strips 76, 78, 80, 82 on the upper side 72 of the former as well as on the lower side 74 thereof. The reinforcement strips in the present exemplary case are in each case present along the longitudinal peripheries of the soft insert 70; the central region of the soft insert 70 is therefore not coated. In as far as the reinforcement strips are applied to the soft insert 70 by way of an immersion bath, the lateral peripheries 84, 86 of the soft insert could also be coated in a corresponding manner. The two lateral peripheries 84, 86 in the present exemplary case remain uncoated.

By contrast to the exemplary embodiment illustrated in FIGS. 14 and 15, the soft insert 70 could also be coated with a reinforcement material only on the upper side 72 of the former or only on the lower side 74 thereof. It would also be possible for the reinforcement material to be provided on the entire upper side 72 and/or on the entire lower side 74.

The coating of the soft insert 70 serves to prevent the soft insert 70 from expanding in an uncontrolled manner, which would lead to untidy seams and to non-reproducible results. Moreover, the coating can ensure that the soft insert can be easily transported through the tool of the sewing machine such that high sewing speeds can be achieved.

The invention claimed is:

1. An assembly comprising:
   a support part having a seam trench;
   a sewn covering for laminating the support part, the sewn covering comprising a lower side, at least one first cover element, and at least one second cover element, the at least one first cover element and the at least one second cover element being interconnected by way of a functional seam, the functional seam forming a seam stump on the lower side of the sewn covering; and
   at least one soft insert at least in portions running along the functional seam and being fixed by the functional seam;
   wherein a maximum width of the seam stump is larger than a width of the seam trench of the support part.

2. The assembly as claimed in claim 1, further comprising a seam band, the seam band covering the seam stump; and
   wherein the seam band is fixed by the functional seam.

3. The assembly as claimed in claim 2, wherein the at least one soft insert is between the seam stump and the seam band.

4. The assembly as claimed in claim 1, wherein the seam stump has an approximately teardrop-shaped cross section.

5. The assembly as claimed in claim 1, wherein the seam band in the longitudinal direction is perforated at least in portions.

6. The assembly as claimed in claim 1, wherein the soft insert in the longitudinal direction is perforated at least in portions.

7. The assembly as claimed in claim 2, wherein the seam band has an external side and an adhesive on the external side.

8. A tape for producing a sewn covering, the tape comprising:
   an at least partially elastic seam band; and
   at least one soft insert fixed to the at least partially elastic seam band in the longitudinal direction of the partially elastic seam band at least in portions;
   wherein the seam band in the longitudinal direction is perforated.

9. The tape as claimed in claim 8, wherein the at least one soft insert in the longitudinal direction is perforated at least in portions.

10. The tape as claimed in claim 8, further comprising two soft inserts;
    wherein the two soft inserts are disposed so as to be mutually parallel; and
    wherein the two soft inserts are fixed to the partially elastic seam band at a certain mutual spacing.

11. The tape as claimed in claim 10, wherein the perforation of the seam band is in the region between the two soft inserts.

12. The tape as claimed in claim 8, wherein the perforation of the seam band is in the region of the at least one soft insert.

13. The assembly as claimed in claim 7, wherein the adhesive is thermally activatable.

14. A sewn covering for laminating a support part, the sewn covering comprising:
    at least one first cover element;
    at least one second cover element;
    a functional seam interconnecting the at least one first cover element and the at least one second cover element, the functional seam forming a seam stump; and
    a seam band enveloping the seam stump and fixed by the functional seam;
    wherein the seam band has a thickness of between 0.2 millimeters and 0.5 millimeters.

15. The sewn covering as claimed in claim 14, further comprising at least one soft insert, the at least one soft insert at least in portions running along the functional seam;
    wherein the at least one soft insert is between the seam stump and the seam band.

16. The sewn covering as claimed in claim 14, wherein no soft insert is in a region of the functional seam.

17. The sewn covering as claimed in claim 14, wherein at least one of the seam stump and the seam band has an approximately teardrop-shaped cross section.

18. The sewn covering as claimed in claim 14, wherein the seam band in the longitudinal direction is perforated at least in portions.

19. The sewn covering as claimed in claim 15, wherein the soft insert in the longitudinal direction is perforated at least in portions.

20. The sewn covering as claimed in claim 14, wherein the seam band has an external side and an adhesive on the external side.

21. The sewn covering as claimed in claim 20, wherein the adhesive is thermally activatable.

* * * * *